United States Patent
de Jong

(10) Patent No.: US 7,634,227 B2
(45) Date of Patent: Dec. 15, 2009

(54) METHOD AND SYSTEM FOR CONTROLLING AUDIO DATA PLAYBACK IN AN ACCESSORY DEVICE

(75) Inventor: Dick de Jong, Emmen (NL)

(73) Assignee: Sony Ericsson Mobile Communications AB, Lund (SE)

( * ) Notice: Subject to any disclaimer, the term of this patent is extended or adjusted under 35 U.S.C. 154(b) by 590 days.

(21) Appl. No.: 11/392,123

(22) Filed: Mar. 29, 2006

(65) Prior Publication Data

US 2007/0232222 A1    Oct. 4, 2007

(51) Int. Cl.
*H04H 7/00* (2006.01)
*H04H 1/00* (2006.01)
*H04B 7/00* (2006.01)

(52) U.S. Cl. .............. 455/3.06; 455/3.01; 455/66.1; 455/344; 455/41.2

(58) Field of Classification Search ............ 455/3.01, 455/3.05, 3.06, 66.1, 344, 426.1, 41.2
See application file for complete search history.

(56) References Cited

U.S. PATENT DOCUMENTS

| | | | |
|---|---|---|---|
| 6,546,426 B1* | 4/2003 | Post | 709/231 |
| 7,411,934 B2* | 8/2008 | Lee et al. | 370/338 |
| 7,580,671 B2* | 8/2009 | Felder | 455/3.04 |
| 2003/0186715 A1 | 10/2003 | McGowan | |
| 2004/0030929 A1* | 2/2004 | Bi et al. | 713/201 |
| 2005/0117583 A1* | 6/2005 | Uchida et al. | 370/395.4 |
| 2006/0268965 A1* | 11/2006 | Ibrahim et al. | 375/149 |
| 2006/0270337 A1* | 11/2006 | Ibrahim et al. | 455/3.01 |
| 2006/0270346 A1* | 11/2006 | Ibrahim et al. | 455/41.2 |
| 2007/0082607 A1* | 4/2007 | Hong et al. | 455/3.06 |
| 2008/0318518 A1* | 12/2008 | Coutinho et al. | 455/3.06 |

FOREIGN PATENT DOCUMENTS

EP    1 655 911 A2    5/2006

OTHER PUBLICATIONS

Eckehard Steinbach et al., "Adaptive Playout for Low Latency Video Streaming," Information Systems laboratory, Department of Electrical Engineering, Stanford University, 2001, 4 pages.
International Preliminary Report on Patentability from corresponding International Application No. PCT/IB06/02691.

* cited by examiner

*Primary Examiner*—Tilahun Gesesse
(74) *Attorney, Agent, or Firm*—Renner, Otto, Boisselle & Sklar, LLP

(57) ABSTRACT

A method of managing audio data received by an accessory device from an electronic equipment over a local wireless interface link includes buffering the audio data; feeding the buffered audio data to a decoder and detecting a decoder under run. After the detection of a decoder under run, the method restarts the feed of audio data to the decoder when an amount of buffered audio data is equal to or greater than a dynamically adjustable threshold amount of audio data.

11 Claims, 3 Drawing Sheets

METHOD AND SYSTEM FOR CONTROLLING AUDIO DATA PLAYBACK IN AN ACCESSORY DEVICE

TECHNICAL FIELD OF THE INVENTION

The present invention relates generally to electronic equipment, such as electronic equipment for engaging in voice communications and/or for playing back audiovisual content to a user. More particularly, the invention relates to a method and system for managing audio data transmitted from a first device to a second device over a local interface for playback to a user.

DESCRIPTION OF THE RELATED ART

Mobile and/or wireless items of electronic equipment are becoming increasingly popular. For example, mobile telephones are now in wide-spread use. In addition, the features associated with certain types of electronic equipment have become increasingly diverse. To name a few examples, many electronic equipment include cameras, video telephone capability, text messaging capability, Internet browsing functionality, electronic mail capability, video playback capability, audio playback capability, image display capability and hands-free headset interfaces.

An item of electronic equipment may be configured to communicate wirelessly over a wireless local interface, such as under a Bluetooth protocol, with one or more accessory devices. For example, if the electronic equipment is a mobile telephone with telecommunications functions, audio data may be transmitted from the mobile telephone to a "hands-free" headset assembly worn by the user. The audio data is decoded by a decoder of the headset assembly and broadcast to the user with a speaker. The headset may include a microphone for detecting the user's speech. The detected speech may be encoded and transmitted to the mobile telephone for carrying out duplexed telephone conversations.

Other audio data may be transmitted from the mobile telephone to the headset for playback to the user, such as a ring tones, audio files (e.g., MP3 files or WAV files), and the like. In some situations, the audio data may be associated with video data displayed on a display of the mobile telephone. In most cases, the audio data is intended to be synchronized with the video data (e.g., a displayed singer's mouth movements are intended to correspond with lyrics broadcast to the user). It will be appreciated that such an audiovisual playback arrangement may be implemented with other types of electronic equipment than a mobile telephone, such as with a personal audio/video player that transmits audio data to headset over a wireless local interface.

If the wireless link between the electronic equipment and headset is not of good quality, the delivery of media packets containing the audio data from the electronic equipment to the headset may become disrupted. A low quality wireless link may arise from a variety of causes, including interference and too great of a distance between the electronic equipment and the headset. Disruption in the delivery of media packets may result in gaps in the audio signal broadcast to the user. For example, if music or other audio data is transmitted over a Bluetooth interface using an advanced audio distribution profile (A2DP), a low quality wireless link may result in failed receipt and/or retransmission of media packets. This disruption may cause a lack of data buffered by the headset, which, in turn, results in an under run by the decoder since data is conventionally decoded as the data becomes available in the buffer. Decoder under runs may result in audible gaps in the delivery of audio content to the user and/or a lack of synchronization between displayed video and broadcast audio.

SUMMARY

According to one aspect of the invention, a method of managing audio data received by an accessory device from an electronic equipment over a local wireless interface link includes buffering the audio data; feeding the buffered audio data to a decoder; detecting a decoder under run; and after the detection of a decoder under run, restarting the feed of audio data to the decoder when an amount of buffered audio data is equal to or greater than a dynamically adjustable threshold amount of audio data.

According to another aspect, the method further includes incrementing the threshold amount of audio data following the detection of a decoder under run.

According to another aspect, the threshold amount of audio data is initially set to a predetermined lowest threshold value.

According to another aspect, the method further includes decrementing the threshold amount of audio data when the local wireless interface link is determined to have improved.

According to another aspect, the method further includes determining improvement in local wireless interface link is based on elapsed time since a most recent decoder under run.

According to another aspect, the local wireless interface link is a Bluetooth link.

According to another aspect, the audio data is transmitted using an advanced audio distribution profile (A2DP).

According to another aspect, the electronic equipment is a mobile telephone and the accessory is a headset.

According to another aspect, the electronic equipment is a video playback device.

According to another aspect, the audio data is intended to be synchronized with the display of video content by the electronic equipment.

According to another aspect of the invention, an accessory for an electronic equipment and for broadcasting audio sounds to a user based on audio data received from the electronic equipment includes a speaker; a local wireless interface adapter for establishing a local wireless interface link with the electronic equipment over which the audio data is received; and an audio data processing device including a buffer for buffering the received audio data and a decoder for decoding the buffered audio data and outputting an audio signal to the speaker. The audio data processing device is configured to feed the buffered audio data to the decoder; detect a decoder under run; and after the detection of a decoder under run, restart the feed of audio data to the decoder when an amount of buffered audio data is equal to or greater than a dynamically adjustable threshold amount of audio data.

According to another aspect of the invention, a program stored on a machine usable medium and for execution by an audio data processing device of an accessory configured to received audio data from an electronic equipment over a local wireless interface link is disclosed. The program, which is for managing the received audio data, includes executable logic to feed buffered audio data to a decoder; detect a decoder under run; and after the detection of a decoder under run, restart the feed of audio data to the decoder when an amount of buffered audio data is equal to or greater than a dynamically adjustable threshold amount of audio data.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 1:
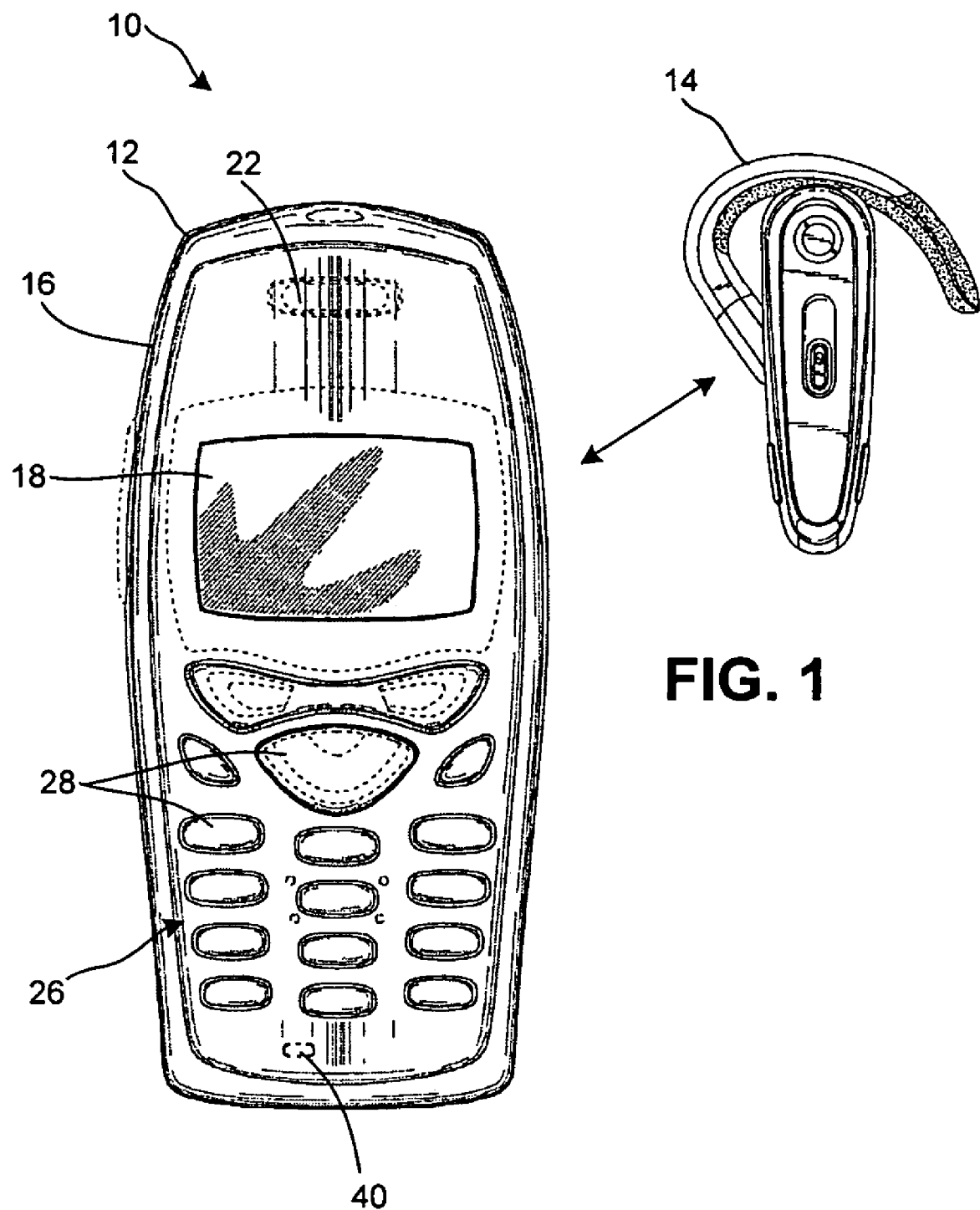
FIG. 1 is a schematic view of a mobile telephone and wireless headset as an exemplary electronic equipment assembly in accordance with an embodiment of the present invention.

The present invention will now be described with reference to the drawings, wherein like reference numerals are used to refer to like elements throughout.

The term "electronic equipment" includes portable radio communication equipment. The term "portable radio communication equipment," which herein after is referred to as a "mobile radio terminal," includes all equipment such as mobile telephones, pagers, communicators, i.e., electronic organizers, personal digital assistants (PDAs), smartphones, portable communication apparatus or the like.

The invention is described primarily in the context of a mobile telephone. However, it will be appreciated that the invention is not intended relate solely to a mobile telephone and can relate to any type of electronic equipment. Other types of electronic equipment that may benefit from aspects of the present invention include playback devices having at least audio playback capability or video playback capability in addition to audio playback capability. Example playback devices include MP3 players, CD players and DVD players.

Referring initially to FIG. 1, an electronic equipment assembly 10 is shown in accordance with the present invention. The illustrated electronic equipment assembly 10 includes an item of electronic equipment 12 and a wirelessly coupled accessory 14. The electronic equipment 12 in the exemplary embodiment is a mobile telephone and will be referred to as the mobile telephone 12. The mobile telephone 12 is shown as having a "brick" or "block" design type housing 16, but it will be appreciated that other type housings, such as a clamshell housing or a slide-type housing, may be utilized without departing from the scope of the invention.

The accessory 14 in the exemplary embodiment is a headset and will be referred to as the headset 14. The headset 14 is shown as an ear mountable speaker and microphone assembly that exchanges audio data with the mobile telephone 12 over a wireless link. For purposes of the description herein, the wireless link is established using a Bluetooth protocol, such as in accordance with the Specification of the Bluetooth System, Covered Core Package version 2.0+EDR, dated Nov. 4, 2004, which is incorporated herein by reference in its entirety. As will be appreciated, other suitable wireless interfaces may be used to transmit data from the mobile telephone 12 to the headset 14 and vice versa, including other protocols and other versions of Bluetooth. In one embodiment, audio data is transmitted from the mobile telephone 12 to the headset 14 over Bluetooth using an advanced audio distribution profile (A2DP).

The mobile telephone 12 includes a display 18. The display 18 displays information to a user such as operating state, time, telephone numbers, contact information, various navigational menus, etc., which enable the user to utilize the various feature of the mobile telephone 12. The display 18 may also be used to visually display content received by the mobile telephone 12 and/or retrieved from a memory 20 (FIG. 2) of the mobile telephone 12. The displayed content may include video presentations derived, for example, from video files, from a received mobile television signal, from a received video telephone signal, etc. In many situations, the video presentations are accompanied by audio presentations. For example, the displayed video component may be a "music video" and the corresponding audio component may be music intended to be synchronized with the video component. As another example, the displayed video component may correspond to a received mobile television signal and the corresponding audio component may be speech and/or music intended to be synchronized with the video component.

The audio component may be broadcast to the user with a speaker 22 of the mobile telephone 12. Alternatively, the audio component may be broadcast to the user with a speaker 24 (FIG. 2) of the headset 14. For stereo listening, the headset 14 may include a pair of speakers 24. Delivery of audio data from the mobile telephone 12 to the headset 14 will be described in greater detail below.

The mobile telephone 12 further includes a keypad 26 that provides for a variety of user input operations. For example, the keypad 26 may include alphanumeric keys 28 for allowing entry of alphanumeric information such as telephone numbers, phone lists, contact information, notes, etc. In addition, the keypad 26 typically may include special function keys such as a "call send" key for initiating or answering a call, and a "call end" key for ending, or "hanging up" a call. Special function keys may also include menu navigation keys, for example, for navigating through a menu displayed on the display 18 to select different telephone functions, profiles, settings, etc., as is conventional. Other keys associated with the mobile telephone 12 may include a volume key, audio mute key, an on/off power key, a web browser launch key, a camera key, etc. Keys or key-like functionality may also be embodied as a touch screen associated with the display 18.

The mobile telephone 12 includes conventional call circuitry that enables the mobile telephone 12 to establish a call and/or exchange signals with a called/calling device, typically another mobile telephone or landline telephone. However, the called/calling device need not be another telephone, but may be some other device such as an Internet web server, content providing server, etc.

Figure 2:
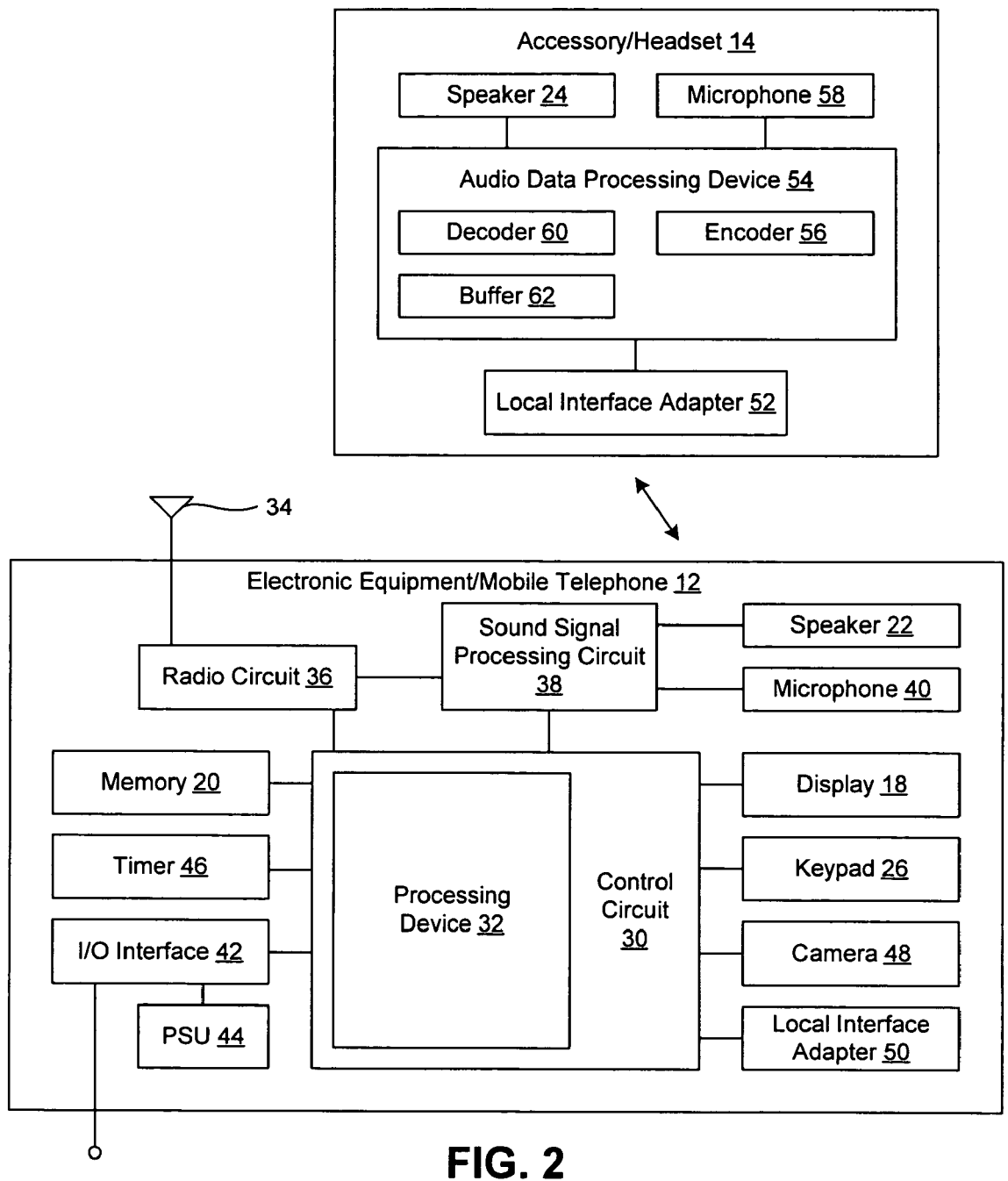
FIG. 2 is a schematic block diagram of the relevant portions of the mobile telephone and wireless headset of FIG. 1 in accordance with an embodiment of the present invention.

With additional reference to FIG. 2, FIG. 2 represents a functional block diagram of the electronic equipment assembly 10. The construction of the mobile telephone 12 may be generally conventional. The mobile telephone 12 includes a primary control circuit 30 that is configured to carry out overall control of the functions and operations of the mobile telephone 12. The control circuit 30 may include a processing device 32, such as a CPU, microcontroller or microprocessor. The processing device 32 executes code stored in a memory (not shown) within the control circuit 30 and/or in a separate memory, such as memory 20, in order to carry out conventional operation of the mobile telephone 12. The memory 20 may be, for example, a buffer, a flash memory, a hard drive, a removable media, a volatile memory and/or a non-volatile memory. In addition, the processing device 32 executes code to carry out various functions of the mobile telephone 12.

Continuing to refer to FIGS. 1 and 2, the mobile telephone 12 includes an antenna 34 coupled to a radio circuit 36. The radio circuit 36 includes a radio frequency transmitter and receiver for transmitting and receiving signals via the antenna 34 as is conventional. The mobile telephone 12 further includes a sound signal processing circuit 38 for processing the audio signal transmitted by/received from the radio circuit 36. Coupled to the sound processing circuit 38 are the speaker 22 and a microphone 40 that enable a user to listen and speak via the mobile telephone 12 as is conventional. The radio circuit 36 and sound processing circuit 38 are each coupled to the control circuit 30 so as to carry out overall operation.

The mobile telephone 12 also includes the aforementioned display 18 and keypad 26 coupled to the control circuit 30. The mobile telephone 12 further includes an I/O interface 42. The I/O interface 42 may be in the form of typical mobile telephone I/O interfaces, such as a multi-element connector at the base of the mobile telephone 12. As is typical, the I/O interface 42 may be used to couple the mobile telephone 12 to a battery charger to charge a power supply unit (PSU) 44 within the mobile telephone 12. In addition, or in the alternative, the I/O interface 42 may serve to connect the mobile telephone 12 to a wired personal hands-free adaptor, to a personal computer or other device via a data cable, etc.

The mobile telephone 12 may also include a timer 46 for carrying out timing functions. Such functions may include timing the durations of calls, generating the content of time and date stamps, etc.

The mobile telephone 12 may include various built-in accessories, such as a camera 48 for taking digital pictures. Image files corresponding to the pictures may be stored in the memory 20. In one embodiment, the mobile telephone 12 also may include a position data receiver (not shown), such as a global positioning satellite (GPS) receiver, Galileo satellite system receiver or the like.

To establish wireless communication with other locally positioned devices, such as a the headset 14, another mobile telephone, a computer, etc., the mobile telephone 12 may include a local wireless interface adapter 50, such as a Bluetooth adaptor.

The mobile telephone 12 may be configured to operate in a communications system (not illustrated). The system can include a server or servers for managing calls placed by and destined to the mobile telephone 12, transmitting content (e.g., image files, audio files, video files, etc.) to the mobile telephone 12 and carrying out any other support functions. The server communicates with the mobile telephone 12 via a network and a transmission medium. The transmission medium may be any appropriate device or assembly, including, for example, a communications tower, another mobile telephone, a wireless access point, a satellite, etc. Portions of the network may include wireless transmission pathways.

The headset 14 includes a local interface adapter 52 that is compatible with the local interface adapter 50 of the mobile telephone 12 to establish a wireless interface between the headset 14 and the mobile telephone 12. The wireless interface may be used to exchange data, such as audio data.

The headset 14 further includes an audio data processing device 54 that manages audio data. For example, the audio data processing device 54 may include an encoder 56 that encodes an audio signal received from a microphone 58 of the headset 14. Encoded audio data may be transmitted to the mobile telephone 12 for use as part of a telephone call.

In addition, the audio data processing device 54 may include a decoder 60 and a data buffer 62 to process audio data received from the mobile telephone 12. The received audio data may be incoming audio data associated with a telephone call. In other situations, the audio data received by the headset 14 may be music derived from an audio file played back by the mobile telephone 12 and transmitted to the headset 14 for listening by the user. In yet other situations, the audio data may be associated with video content displayed on the display 18 by the mobile telephone 12. For example, a video file containing an audio component stored in the memory 20 may be played back by the mobile telephone 12 or a video signal containing an audio component may be received by the mobile telephone 12. In these situations, a video component of the video file or received video signal may be decoded by, for example, the control circuit 30 or dedicated video decoder (not shown) to generate a video signal output to the display 18 for viewing. The audio component of the video file or received video signal may be decoded and delivered as an audio signal to the speaker 22 and/or the audio component may be transmitted as audio data to the headset 14 for decoding into an audio signal that is broadcast by the speaker 24.

In the illustrated embodiment, audio data transmitted from the mobile telephone 12 to the headset 14 is in the form of media packets. Each media packet may contain a quantity of audio data, such as about 5 milliseconds of audio data. The audio data may be buffered by the buffer 62 and decoded by the decoder 60 into an audio signal for delivery to the speaker 24. As will be appreciated, the audio data may be mono, stereo or surround-sound, or arranged in any other suitable audio format.

Figure 3:
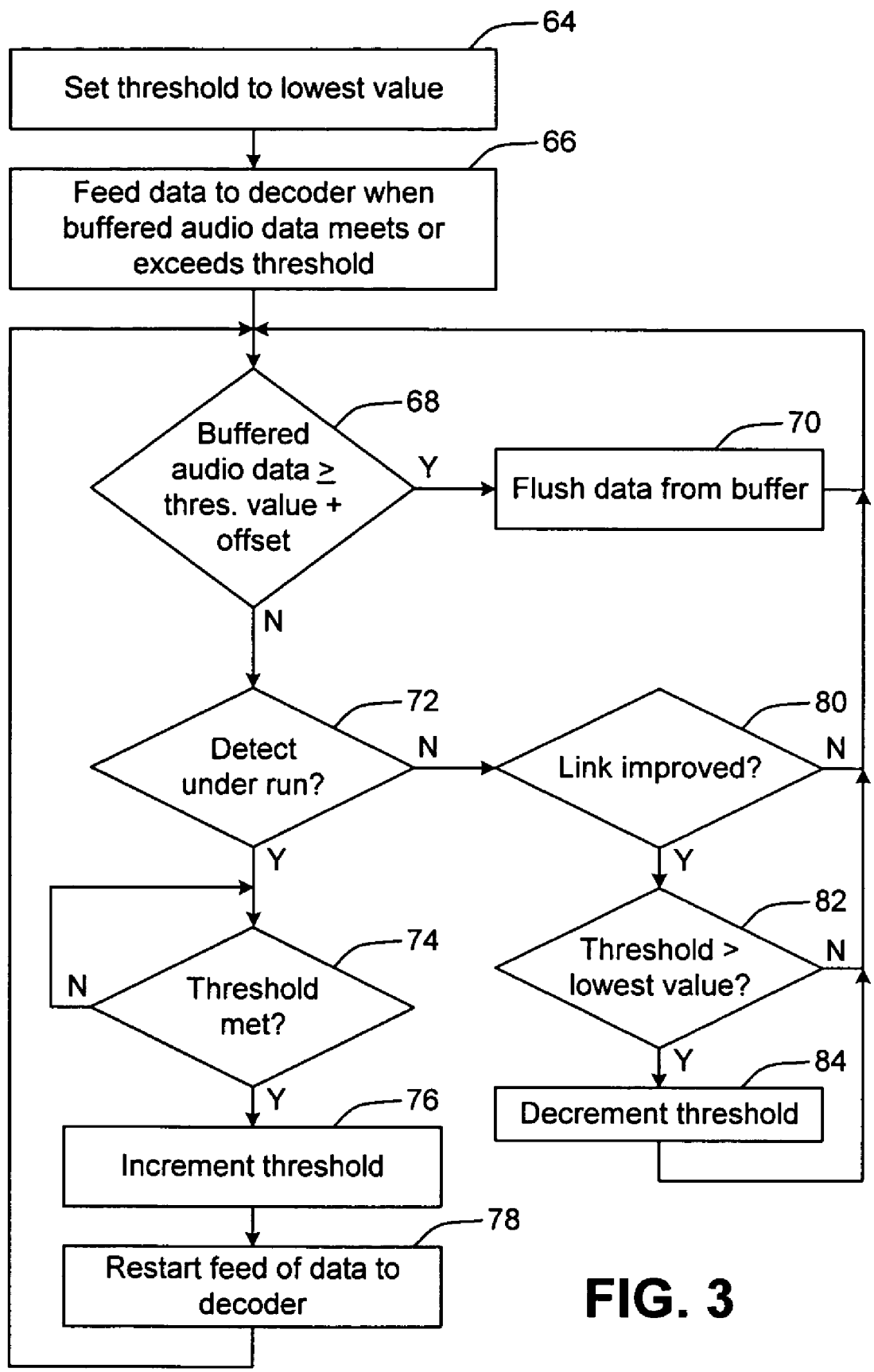
FIG. 3 is a flow chart of an exemplary method of managing audio data in accordance with an embodiment of the present invention.

With additional reference to FIG. 3, a method of managing audio data in the headset 14 is illustrated. The functionality of the method may be embodied in the audio data processing device 54 or associated components of the headset (e.g., a memory). Accordingly, the functionality of the method may take any suitable physical form, such as being implemented in executable logic embodied in a computer or machine readable medium, in firmware, in hardware (e.g., as dedicated circuit components) or combinations of formats. In one embodiment, the method of managing audio data is embodied as executable code executed by the audio data processing device 62.

The method of FIG. 3 will be described in the context of synchronizing an audio component broadcast to the user by the headset 14 with a video component displayed by the mobile telephone 12. However, it will be appreciated that the method may be used to improved broadcasting of sounds to the user with the headset 14 in the absence of a video component (e.g., when playing back a ring tone or other audio file).

In the method, when there is a presence of decoder under runs, a threshold amount of audio data that may be buffered before decoding is optimized so that good audio quality may be achieved and so that good synchronization with displayed video may achieved, even if the wireless link between the mobile telephone 12 and the headset 14 is not optimal (e.g., media packets are subject to being dropped and retransmitted).

The method may start in block 64 where a threshold value is set to a predetermined lowest threshold value. The threshold value is used after a decoder under run is detected to determine an amount of audio data that is to be buffered before audio data is feed to the decoder for decoding. In the embodiment described herein, the threshold value is expressed in terms of number of media packets. Each media packet may contain a certain amount of audio data measured in size (e.g., bytes), which may have a direct correlation to a length of time. Therefore, for any given number of media packets, a corresponding time or size value may be obtained and vice versa. As indicated above, in a typical Bluetooth wireless link using A2DP, each media packet may contain about 5 milliseconds worth of audio data.

In the exemplary embodiment, the predetermined lowest threshold value is zero media packets, but may be a higher value (e.g., one media packet, two media packets, fractional media packet, etc.) depending on a desired level of video/audio synchronization, hardware components of the headset 14, etc.

In block 66, audio data, if present in the buffer 62 to meet or exceed the threshold value set in block 64, is feed to the decoder 60 for decoding and generation of the audio signal output to the speaker 24. If there is no buffered audio data or if the buffered audio data is less than the threshold set in block 64, the logic may wait until sufficient audio data is buffered before feeding audio data to the decoder 60.

In block 68, the amount of buffered audio data may be compared against the current threshold value plus a predetermined offset value. As will be described below, the threshold value may be changed from the initial value set in block 64 by carrying out other functional blocks of the method. In a preferred embodiment, the offset value is at least the size of one media packet. If, for some reason, the amount of buffered data exceeds the threshold value, it may be concluded that there is a backlog of audio data in the buffer 60 and that the audio component output to the user may be lagging behind the displayed video component. For example, for quality synchronization of the audio component to the video component, it may be desirable to keep the latency of the audio component to about 60 milliseconds or less.

For purposes of comparing the amount of buffered data and the threshold value plus the offset value, each quantity may be expressed the same units (e.g., bytes or time equivalent). In one embodiment, a timer may be associated with block 68 so that a positive determination is made if the buffered audio data meets or exceeds the threshold value plus the offset value for a certain amount of time. The offset value is added to the threshold value for the comparison of block 68 to avoid entering into a loop of flushing audio data (block 70 described below) and then detecting an under run (block 72 described below).

If a positive determination is made in block 68, the method may proceed to block 70 where audio data may be flushed from the buffer 62. For example, buffered audio data may be deleted from the buffer 62 without being passed to the decoder 60 for decoding and delivery to the speaker 24 as an audio signal. In effect, flushing audio data from the buffer 62 has the effect of skipping a portion of the audio content. New incoming audio data may then be buffered, decoded and broadcast with closer synchronization to the displayed video component (e.g., the audio component may be more "real time" with the video component). Therefore, to the user, the combined effect of blocks 68 and 70 is to skip through a portion of audio data to resynchronize the audio with the video.

Blocks 68 and 70 server as a precaution against the build-up of a large buffer backlog of audio data that may cause the audio component to become unsynchronized with the video component. In some situations, such as when no video component is associated with the audio component, blocks 68 and 70 may be omitted since audio synchronization is not in issue. In other implementations, the functionality of blocks 68 and 70 may be removed from the method in favor of being implemented in background logic so that if the condition of block 68 arises at any time in the processing of audio data, the function of block 70 may be carried out.

Following block 70, the method may return to block 66 so that if the feed of data to the decoder 60 stopped, the feed of data from the buffer 62 to the decoder 60 may be resumed. Alternatively, the logic may return to block 64 where the threshold value is reset to the predetermined lowest threshold value (e.g., it may be assumed that the flush of data in block 70 obviates the need for a higher threshold value setting that may have resulted from earlier iterations of the method). Alternatively, the logic may proceed to block 72.

If a negative determination is made in block 68, the method may proceed to block 72. In block 72, the method detects if an under run has occurred. An under run may be indicated by a lack of audio data input to the decoder 60 for decoding. For instance, if there are several retransmissions of media packets in a closely spaced period of time, there may be insufficient data being passed from the buffer 62 to the decoder 60 to decode into the audio signal output to the speaker 24 for broadcast to the user. For many audio applications, decoding may run at a sampling frequency such as 44.1 kHz or 48 kHz. On every sample, the decoder 60 may check for data input to the decoder (or, alternatively, output from the decoder) and, if no data is present, an under run may be detected.

Upon a positive determined in block 72, the method may proceed to block 74 where a determination is made as to whether the current threshold value is met. The threshold value is met if the buffer 62 contains an amount of audio data that is greater than or equal to the threshold value. If the threshold value is zero, block 74 may be satisfied if any data is present in the buffer 66 (buffered data is greater than the threshold value). If the threshold value is expressed in number of media packets and the amount of buffered data is expressed in bytes, the threshold value may be translated to bytes for comparison to the amount of buffered data, or the amount of buffered data may be translated in to number of media packets for the comparison.

If the threshold value is not met in block 74 (a negative determination in block 74), the method may wait until the threshold value is met (a positive determination in block 74). Upon a positive determination in block 74, the method may proceed to block 76 where the threshold value is incremented. Accordingly, in block 76 the threshold value may be increased by one media packet, or size or time equivalent thereof. For some applications, the threshold may be incremented by an amount other than one media packet, such as multiple media packets (e.g., two media packets, three media packets, etc.) or a fractional value (e.g., a half a media packet, 1.25 media packets, 1.5 media packets, etc.). As an example, if the increment step size is one media packet, and the threshold value coming into block 76 was three media packets, the threshold value coming out of block 76 would be four media packets.

Next, in block 78, the feed of data from the buffer 62 to the decoder 60 is restarted. Following block 78, the method may return to block 68. Thereafter, with the next under run detection (block 72), a larger amount of audio data (corresponding to the size of the increment of block 76) compared to the previous iteration of the method will need to be buffered before decoding is restarted (blocks 74 and 78).

The process of blocks 72 through 80 assists in maintaining a quality audio output to the user. In particular, audio quality may be maintained even if the wireless link between the mobile telephone 12 and the headset 14 degrades so that media packet retransmission starts to occur. As a result, the operable range of the wireless link for use in watching video on the mobile telephone 12 and listening to corresponding audio with the headset 14 may be extended beyond that which may be conventionally achieved. Further, the method has particular application in Bluetooth links and similar links where the media player (e.g., the mobile telephone 12 acting as a Bluetooth master device) pushes audio data to the accessory (e.g., the headset 24 acting as a Bluetooth slave device) in frames or media packets. In such an arrangement, incoming data is buffered since the pace with which data is incoming may be unknown (e.g., a gap in data may occur if one or more data packets are retransmitted due to link degradation). Conventionally, audio data is decoded as soon as it is buffered. However, the user may be able to hear gaps in decoded audio data caused by media packet retransmission. In addition, if too much data is buffered, the audio component will lag the video component. The method addresses both of these Bluetooth (and other similar wireless interface) related issues, but may also be applied to links where the accessory polls the media player for data.

To reduce possible audio component latency when the link is working well (e.g., there are no media packet retransmissions or media packet retransmissions are sparse), the method may include logic to reduce the threshold value. For example, returning now to block 72, if a negative determination is made in block 72 the method may proceed to block 80.

In block 80, a determination is made as to whether the link has improved. The link may improve for a variety of reasons, such as the user moving so that the headset 14 is closer to the mobile telephone 12, a source of interference has been removed, etc. The determination in block 80 may be made based on the amount of time that elapsed since the last detected under run. For example, if a predetermined amount of time has elapsed since the last under run, the link may be considered to have improved. The elapsed time from the last detected under run for basing the determination of block 80 may be about half a second to about twenty seconds. In one embodiment, the elapsed time from the last detected under run for basing the determination of block 80 may be about ten seconds. If the link has not improved (e.g., the amount of time since the last under run is less than the predetermined amount of time) a negative determination may be made in block 80 and the method may return to block 68.

If a positive determination is made in block 80, the method may proceed to block 82 where a determination is made as to whether the current threshold value is greater than the predetermined lowest threshold value of block 64. If the threshold value is not greater than the predetermined lowest threshold value (e.g., the threshold value equals the predetermined lowest threshold value), the method may return to block 68.

If a positive determination is made in block 82, the method may proceed to block 84 where the threshold value is decremented. The amount of threshold value decrementation in block 84 need not equal the amount of threshold value incrementation of block 80. In one embodiment, the decrementation step size of block 84 is by one media packet, or size or time equivalent thereof. In other embodiments, the threshold may be decremented by an amount other than one media packet, such as multiple media packets (e.g., two media packets, three media packets, etc.) or a fractional value (e.g., a half a media packet, 1.25 media packets, 1.5 media packets, etc.). As an example, if the decrement step size is one media packet, and the threshold value coming into block 84 was five media packets, the threshold value coming out of block 84 would be four media packets. Following block 84, the method may return to block 68.

The method provides a way to manage audio data in the headset using a dynamically adjusted threshold value. Depending on link quality, the threshold may be adjusted to be large enough to seamlessly bridge most gaps in data transmission from mobile telephone 12 to headset 14 without audible gaps in the audio broadcast to the user. In addition, the threshold is maintained to be low enough so that synchronization between displayed video and broadcast audio may be maintained. Accordingly, a good user experience while watching video and listening to audio may be maintained. In addition, the operative range of the wireless link may be increased over configurations where a conventional audio data management technique is used since compensation may be made for media packet retransmission that is likely to occur when the distance between mobile telephone 12 and headset 14 is relatively large.

Various values associated with the method may be tuned for factors such as the particular hardware configuration the headset 14, media packet size, sampling rate of the decoder, etc. For example, the predetermined lowest threshold value, the increment step size, the decrement step size, the time period for determining link improvement and so forth may be adjust based on buffer size, RAM resources, a desired link quality level, etc.

It will be apparent to a person having ordinary skill in the art of computer programming and/or circuit design, and specifically in applications programming for mobile telephones and other items of electronic equipment, how to program and/or configure an accessory (e.g., the headset 14) to operate and carry out the functions described herein. Accordingly, details as to any specific programming code and/or circuit implementation have been left out for sake of brevity.

Although the illustrations appended hereto that show a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores, or messages may be added to the logical flow for purposes of enhanced utility, accounting, performance, measurement, troubleshooting, and the like. It is understood that all such variations are within the scope of the present invention.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A method of managing audio data received by an accessory device from an electronic equipment over a local wireless interface link, comprising:
   buffering the audio data;
   feeding the buffered audio data to a decoder;
   detecting a decoder under run;
   after the detection of a decoder under run, restarting the feed of audio data to the decoder when an amount of buffered audio data is equal to or greater than a dynamically adjustable threshold amount of audio data; and
   flushing buffered audio data if an amount of buffered audio data is greater than the threshold value plus an offset value selected to minimize lag of the audio output with respect to the displayed video content; and wherein the dynamically adjustable threshold amount is initially set to a predetermined threshold value and is incremented after each detected decoder under run and is decremented when the local wireless interface link is determined to have improved based on elapsed time since a most recent decoder under run, the incrementing and decrementing to synchronize the output of audio corresponding to the audio data with video content displayed by the electronic equipment.

2. The method of claim 1, wherein the local wireless interface link is a Bluetooth link.

3. The method of claim 2, wherein the audio data is transmitted using an advanced audio distribution profile (A2DP).

4. The method of claim 1, wherein the electronic equipment is a mobile telephone and the accessory is a headset.

5. The method of claim 1, wherein the electronic equipment is a video playback device.

6. An accessory for an electronic equipment, the accessory for broadcasting audio sounds to a user based on audio data received from the electronic equipment, comprising:

a speaker;

a local wireless interface adapter for establishing a local wireless interface link with the electronic equipment over which the audio data is received; and an audio data processing device including a buffer for buffering the received audio data and a decoder for decoding the buffered audio data and outputting an audio signal to the speaker, the audio data processing device configured to:

feed the buffered audio data to the decoder;

detect a decoder under run;

after the detection of a decoder under run, restart the feed of audio data to the decoder when an amount of buffered audio data is equal to or greater than a dynamically adjustable threshold amount of audio data; and flush buffered audio data if an amount of buffered audio data is greater than the threshold value plus an offset value selected to minimize lag of the audio output with respect to video content displayed by the electronic equipment; and wherein the dynamically adjustable threshold amount is initially set to a predetermined threshold value and is incremented after each detected decoder under run and is decremented when the local wireless interface link is determined to have improved based on elapsed time since a most recent decoder under run, the incrementing and decrementing to synchronize the output of audio corresponding to the audio data with video content displayed by the electronic equipment.

7. The accessory of claim 6, wherein the local wireless interface link is a Bluetooth link.

8. The accessory of claim 6, wherein the electronic equipment is a mobile telephone and the accessory is a headset.

9. A computer readable medium storing a program for execution by an audio data processing device of an accessory that is configured to received audio data from an electronic equipment over a local wireless interface link, the program for managing the received audio data and comprising executable logic to:

feed buffered audio data to a decoder;

detect a decoder under run;

after the detection of a decoder under run, restart the feed of audio data to the decoder when an amount of buffered audio data is equal to or greater than a dynamically adjustable threshold amount of audio data; and flush buffered audio data if an amount of buffered audio data is greater than the threshold value plus an offset value selected to minimize lag of the audio output with respect to video content displayed by the electronic equipment; and wherein the dynamically adjustable threshold amount is initially set to a predetermined threshold value and is incremented after each detected decoder under run and is decremented when the local wireless interface link is determined to have improved based on elapsed time since a most recent decoder under run, the incrementing and decrementing to synchronize the output of audio corresponding to the audio data with video content displayed by the electronic equipment.

10. The computer readable medium of claim 9, wherein the local wireless interface link is a Bluetooth link.

11. The computer readable medium of claim 9, wherein the electronic equipment is a mobile telephone and the accessory is a headset.

* * * * *

UNITED STATES PATENT AND TRADEMARK OFFICE
CERTIFICATE OF CORRECTION

PATENT NO.       : 7,634,227 B2                                    Page 1 of 1
APPLICATION NO.  : 11/392123
DATED            : December 15, 2009
INVENTOR(S)      : Dick de Jong It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 851 days.

Signed and Sealed this

Ninth Day of November, 2010

David J. Kappos
*Director of the United States Patent and Trademark Office*